US011770058B2

(12) United States Patent
Polesel et al.

(10) Patent No.: US 11,770,058 B2
(45) Date of Patent: Sep. 26, 2023

(54) PERMANENT MAGNET GENERATOR WITH NON-REGULAR ARMED STATOR

(71) Applicants: LUXEMBOURG INSTITUTE OF SCIENCE AND TECHNOLOGY (LIST), Esch-sur-Alzette (LU); Rotarex S.A, Lintgen (LU)

(72) Inventors: Jérôme Polesel, Mexy (FR); Mathieu Gerard, Cutry (FR); Mohamed El Hachemi, Bertrange (LU); Abdelmoumin Allioua, Darmstadt (DE)

(73) Assignees: Luxembourg Institute of Science and Technology (LIST), Esch-sur-Alzette (LU); Rotarex S.A., Lintgen (LU)

( * ) Notice: Subject to any disclaimer, the term of this patent is extended or adjusted under 35 U.S.C. 154(b) by 116 days.

(21) Appl. No.: 17/298,231

(22) PCT Filed: Nov. 28, 2019

(86) PCT No.: PCT/EP2019/082890
§ 371 (c)(1),
(2) Date: May 28, 2021

(87) PCT Pub. No.: WO2020/109458
PCT Pub. Date: Jun. 4, 2020

(65) Prior Publication Data
US 2022/0115937 A1    Apr. 14, 2022

(30) Foreign Application Priority Data

Nov. 28, 2018   (LU) .......................... 101021

(51) Int. Cl.
*H02K 1/14*        (2006.01)
*H02K 21/14*       (2006.01)
(Continued)

(52) U.S. Cl.
CPC .............. *H02K 21/14* (2013.01); *H02K 1/27* (2013.01); *H02K 7/1823* (2013.01);
(Continued)

(58) Field of Classification Search
CPC ... H02K 1/145; H02K 7/1846; H02K 2213/03
See application file for complete search history.

(56) References Cited

U.S. PATENT DOCUMENTS

| 4,963,780 A * | 10/1990 | Hochstrasser | .......... F03B 13/00 |
| | | | 4/623 |
| 2008/0174209 A1* | 7/2008 | Matsubara | ............. H02K 7/063 |
| | | | 310/49.36 |

FOREIGN PATENT DOCUMENTS

| DE | 19954964 A1 | 5/2001 |
| EP | 0425260 A1 | 5/1991 |

(Continued)

OTHER PUBLICATIONS

Jong Gun Lee et al.; "Effects of V-Skew On the Torque Characteristic in Permanent Magnet Synchronous Motor" (Journal of International Conference On Electrical Machines and Systems, Dec. 2013, vol. 2, No. 4, pp. 390-393).

(Continued)

*Primary Examiner* — Dang D Le
(74) *Attorney, Agent, or Firm* — Sandberg Phoenix & von Gontard PC

(57) ABSTRACT

An electric generator having a rotor with permanent magnets, configured for rotating about a rotation axis; a stator having at least one magnetic yoke with arms extending axially inside or outside of the rotor so as to be adjacent to a radial inner or outer side, respectively, of the rotor; wherein the arms of the at least one magnetic yoke are circumferentially distributed so as to form a slot between each pair of adjacent arms, each slot and each arm showing a width. The widths of the arms and/or the widths of the slots have different values distributed along the circumference. The invention is also directed to a valve having the electric generator equipped with a turbine wheel for being driven by a flow of gas in the valve.

18 Claims, 12 Drawing Sheets

(51) Int. Cl.
*H02K 1/27* (2022.01)
*H02K 7/18* (2006.01)
*H02K 21/12* (2006.01)

(52) U.S. Cl.
CPC ......... *H02K 7/1846* (2013.01); *H02K 21/125* (2013.01); *H02K 2213/03* (2013.01)

(56) References Cited

FOREIGN PATENT DOCUMENTS

| EP | 1699126 A2 | 10/2006 |
|----|------------|---------|
| GB | 2491880 A | 12/2012 |
| JP | 02197243 A | 8/1990 |

OTHER PUBLICATIONS

N. Levin et al.; "Methods To Reduce the Cogging Torque in Permanent Magnet Synchronous Machines" (Elektronika IR Elektrotechnika, ISSN 1392-1215, vol. 19, No. 1, pp. 23-26, 2013).
C. Hsiao et al. In "A Novel Cogging Torque Simulation Method for Permanent-Magnet Synchronous Machines" (Energies 2011, 4, 2166-2179; DOI:10.3390/EN4122166).
International Search Report for PCT/EP2019/082890 dated Feb. 13, 2020.
Written Opinion for PCT/EP2019/082890 dated Feb. 13, 2020.

\* cited by examiner

|  | Reference Model 1 e = 0.85 mm | Reference Model 2 e = 1.5 mm | Reference Model 3 e = 2.5 mm |
|---|---|---|---|
| Flux amplitude ($\mu$Wb) | 9,9 | 5,3 | 2,6 |
| Power_elec_max (mW) | 165 | 48 | 11,4 |
| Max cogging torque (mN.m) | 0,82 | 0,19 | 0,022 |
| min cogging torque (mN.m) | -0,75 | -0,19 | -0,023 |
| $\Delta$ peak-to-peak cogging torque (mN.m) | 1,57 | 0,38 | 0,045 |
| Max dynamic torque (mN.m) | 0,82 | 0,184 | 0,02 |
| min dynamic torque (mN.m) | -0,73 | -0,22 | -0,019 |
| $\Delta$ peak-to-peak dynamic torque (mN.m) | 1,55 | 0,404 | 0,039 |
| $\Gamma$(%)=Power_elec/Power_meca*100 | 6,72 | 7,50 | 18,46 |

|  | Reference Model 1 e = 0.85 mm | Linear Increment Model e = 0.85 mm | R-02 e = 0.85 mm | R-05 e = 0.85 mm | R-06 e = 0.85 mm |
|---|---|---|---|---|---|
| Flux amplitude ($\mu$Wb) | 9,9 | 3,5 | 4,4 | 3,9 | 3,6 |
| Power_elec_max (mW) | 165 | 22 | 33 | 26,5 | 23 |
| Correlation factor | 0,7 | 0,35 | 0,43 | 0,39 | 0,37 |
| Max cogging torque (mN.m) | 0,82 | 0,07 | 0,003 | 0,094 | 0,05 |
| min cogging torque (mN.m) | -0,75 | -0,181 | -0,08 | -0,07 | -0,108 |
| Δ peak-to-peak cogging torque (mN.m) | 1,57 | 0,251 | 0,083 | 0,164 | 0,158 |
| Max dynamic torque (mN.m) | 0,82 | 0,073 | 0,013 | 0,11 | 0,096 |
| min dynamic torque (mN.m) | -0,73 | -0,17 | -0,072 | -0,059 | -0,063 |
| Δ peak-to-peak dynamic torque (mN.m) | 1,55 | 0,243 | 0,085 | 0,169 | 0,159 |
| Γ(%)=Power_elec/Power_meca*100 | 6,72 | 5,72 | 24,52 | 9,90 | 9,14 |

PERMANENT MAGNET GENERATOR WITH NON-REGULAR ARMED STATOR

The present invention is the US national stage under 35 U.S.C. § 371 of International Application No. PCT/EP2019/082890 which was filed on Nov. 28, 2019, and which claims the priority of application LU 101021 filed on Nov. 28, 2018, the content of which (text, drawings and claims) are incorporated here by reference in its entirety.

FIELD

The invention is directed to the field of electric machines, more particularly to electric machines with permanent magnets, even more particularly to permanent magnet synchronous machines. The invention is also directed to the stator of such machines.

BACKGROUND

Prior art patent document published DE 199 54 964 A1 discloses a hydraulic turbine generator. The generator is of a compact construction suitable to be mounted on a conduit for converting a flow of fluid in the conduit into electrical power. The generator comprises a turbine wheel and a rotor mounted on a shaft. The rotor is surrounded by a cylindrical wall delimiting a cavity for the rotor and the fluid. The rotor comprises permanent magnets and a stator is arranged around the wall. The stator comprises a first element made of ferromagnetic material with a base portion and a series of arms extending axially from the base portion along the outer surface of the wall, a second similar element with also a base portion and series of arms offset relative to those of the first element, and a coil arranged between the base portions of the first and second elements.

Prior art patent document published JP 02197243 A also discloses a compact generator of a similar construction to the preceding document. The rotor shows permanent magnets which are however oriented S-N-S- . . . along the rotor periphery. Also, there is no wall separating the rotor and the stator because there is no working fluid, except air, circulating and in contact with the rotor.

Prior art patent document published EP 0 425 260 A1 also discloses a compact generator of a similar construction to the two preceding documents. It concerns a built-in generator arranged within a hub of a cycle wheel, including a hub member rotatably fitted on an axle which is to be fixed to a frame of the cycle, a stator composed of two poles armatures each with four arms, fixed to the axle in the hub member, a generating coil unit (held between the two four strip-shaped poles armatures of the stator) provided in the stationary hollow cylinder and fixed thereto, and a rotor formed integrally with a magnet rotatably provided on the axle.

Generally speaking, in permanent magnet electric generators, the rotor shows a cogging torque, i.e. a periodic oscillation torque, at rest, i.e. when the windings are not energized, where the magnetic field of the rotor tends to align with the magnetic poles of the stator. For many applications, that cogging torque is not an issue in that the drive torque on the rotor is large enough for overcoming that resistant torque. However for some applications where the drive torque is low, typically in fluid operated applications with low torque and high speed applications, the cogging torque can prevent the generator from rotating while a torque is applied thereto.

Chun-Yu Hsiao et al. in "A Novel Cogging Torque Simulation Method for Permanent-Magnet Synchronous Machines" (Energies 2011, 4, 2166-2179; doi:10.3390/en4122166) addresses the problem of reducing the cogging torque in a permanent magnet synchronous machines, essentially by splitting the rotor into several segments and by angularly skewing these segments. If the case of a rotor with two segments, the skew angle is one half of the cogging torque period. This solution is however not quite easily applicable to very compact electric generators.

Similarly, Jong Gun Lee et al. in "Effects of the V-Skew on the Torque Characteristic in Permanent Magnet Synchronous Motor", Journal of International Conference on Electrical Machines and Systems Vol. 2, No. 4, pp. 390–393, 2013, proposed a similar solution consisting essentially in providing a V-Skew of the permanent rotor. Similarly, to the above teaching, this solution is difficult to apply in very compact electric generators.

N. Levin et al. in "Methods to Reduce the Cogging Torque in Permanent Magnet Synchronous Machines", ELEKTRONIKA IR ELEKTROTECHNIKA, ISSN 1392-1215, VOL. 19, NO. 1, 2013, addresses also that problem by skewing stator slots. This however increases the complexity and manufacturing costs of the stator.

SUMMARY

The invention has for technical problem to overcome at least one of the drawbacks of the above cited prior art. More specifically, the invention has for technical problem to provide a permanent magnet electric generator with a reduced cogging torque. Even more specifically, the invention has for technical problem to provide a permanent magnet electric generator with a reduced cogging torque that is compact and easy to manufacture. Also, the invention has for technical problem to optimize the efficiency of the generator defined by the ratio of the output electrical power over the input mechanical power.

The invention is directed to an electric generator comprising a rotor with permanent magnets, configured for rotating about a rotation axis; at least one magnetic yoke with arms extending axially inside or outside of the rotor so as to be adjacent to a radial inner or outer side, respectively, of the rotor; wherein the arms are circumferentially distributed so as to form a slot between each pair of adjacent arms, each slot and each arm showing a width; wherein the widths of the arms and/or the widths of the slots have different values distributed along the circumference.

The widths of the arms and/or the widths of the slots are average widths or taken in a same crossing plane perpendicular to the rotation axis if the widths vary axially. Alternatively, the widths of the arms and/or the widths of the slots can be constant axially.

According to an exemplary embodiment, the width of the slots is constant along the circumference.

According to an exemplary embodiment, the width of the arms increases progressively along the circumference. The increase extends advantageously over a complete revolution.

According to an exemplary embodiment, the width of the arms increases linearly along the circumference. The increase extends advantageously over a complete revolution.

According to an exemplary embodiment, the widths of the arms are distributed randomly along the circumference. The distribution is advantageously over a complete revolution.

According to an exemplary embodiment, each arm extends angularly over a sector $$\theta_i = \frac{\langle \theta \rangle}{2} + i \cdot d\theta$$

where i is an integer comprised between 1 and N; N being the number of arms and $\langle \theta \rangle$ being an average sector angle of the N arms.

According to an exemplary embodiment, for each next arm along the circumference i is incremented by 1.

According to an exemplary embodiment, for each next arm along the circumference i is taken from a random permutation of the integers from 1 to N. N is any value that is an even number corresponding to the total number of arms that is equal to or higher than 4.

According to an exemplary embodiment, the random permutation of the integers from 1 to N where N=16 is one of the following: [10, 15, 6, 12, 11, 8, 14, 7, 16, 13, 9, 1, 5, 4, 2, 3], [14, 11, 8, 5, 3, 1, 9, 2, 6, 15, 4, 12, 13, 16, 7, 10] and [9, 14, 10, 16, 12, 3, 4, 5, 11, 1, 2, 6, 7, 8, 15, 13].

According to an exemplary embodiment, the at least one yoke comprises several yokes, the arms of the yokes repeatedly alternating along the circumference.

According to an exemplary embodiment, each of the at least one yoke comprises a central portion interconnecting the arms of the yoke.

According to an exemplary embodiment, each of the arms comprises a bent end portion fixed to the central portion.

According to an exemplary embodiment, the electric generator further comprises an electric coil arranged between the central portions of the yokes.

According to an exemplary embodiment, the electric generator further comprises a turbine wheel mechanically coupled to the rotor.

According to an exemplary embodiment, the electric generator further comprises a shaft supporting the rotor and the turbine wheel, and bearings at each end of the shaft.

According to an exemplary embodiment, the turbine wheel is an axial turbine wheel comprising blades extending radially and configured for being converting an annular axial flow through the blades into a rotational movement of the turbine wheel and the rotor.

The invention is also directed to a valve for gas cylinder, comprising a body with an inlet, an outlet and a passage interconnecting the inlet and outlet; a flow control device mounted on the body and controlling the flow of gas in the passage; wherein the valve further comprises an electric generator with a turbine wheel located in the passage, configured for outputting electric power when the gas flow in the passage rotates the turbine wheel, wherein the electric generator is according to various embodiments of the invention.

The turbine wheel located can be located upstream or downstream of the flow control device.

The invention is also directed to a conduit with a wall delimiting a passage for a fluid and with an electric generator with a turbine wheel located in the passage so as to be driven when the fluid flows, wherein the generator is according to various embodiments of the invention.

The invention is also directed to a use of an electric generator with a turbine wheel in a conduit for producing electricity while the fluid flows in the conduit, wherein the generator is according to various embodiments of the invention.

The invention is also directed to a method for dimensioning an electric generator comprising a rotor with permanent magnets, configured for rotating about a rotation axis; at least one magnetic yoke with arms extending axially inside or outside of the rotor so as to be adjacent to a radial inner or outer side, respectively, of the rotor; and wherein the arms are circumferentially distributed so as to form a slot between each pair of adjacent arms, each slot and each arm showing a width; comprising a step of dimensioning the widths of the arms and/or the widths of the slots with different values distributed along the circumference so as to lower a cogging torque on the rotor.

According to an exemplary embodiment, lowering a cogging torque on the rotor is relative to a configuration where the widths of the arms and the widths of the slots are constant along the circumference.

The invention is particularly interesting in that reduces the cogging torque of the electric generator. The cogging torque in an electric machine, for instance a generator, comprising permanent magnets on the rotor is the natural consequence of the stator which shows a circumferentially non-constant magnetic permeability. Each permanent magnets is subject to an attraction force with the ferromagnetic arms of the stator. A regular distribution of these arms, as this is usual, has for effect that these forces are maximum for several, if not all, of the permanent magnets, leading to a potentially high cogging torque. Such a cogging torque is not particularly problematic for applications where the drive torque is comparatively high, e.g. in a bicycle dynamo. However for application with a very low drive torque, this can be problematic. The irregular distribution according to various embodiments of the invention is particular interesting because it significantly decreases the cogging torque and allows therefore rotation of the generator even with very low drive torques, e.g. a flow of fluid, like gas, on a turbine wheel, while delivering optimized electrical power levels.

DRAWINGS

DETAILED DESCRIPTION

FIGS. 1 to 6 illustrate the construction and characteristics of an electric generator according to the state of the art.

Figure 1:
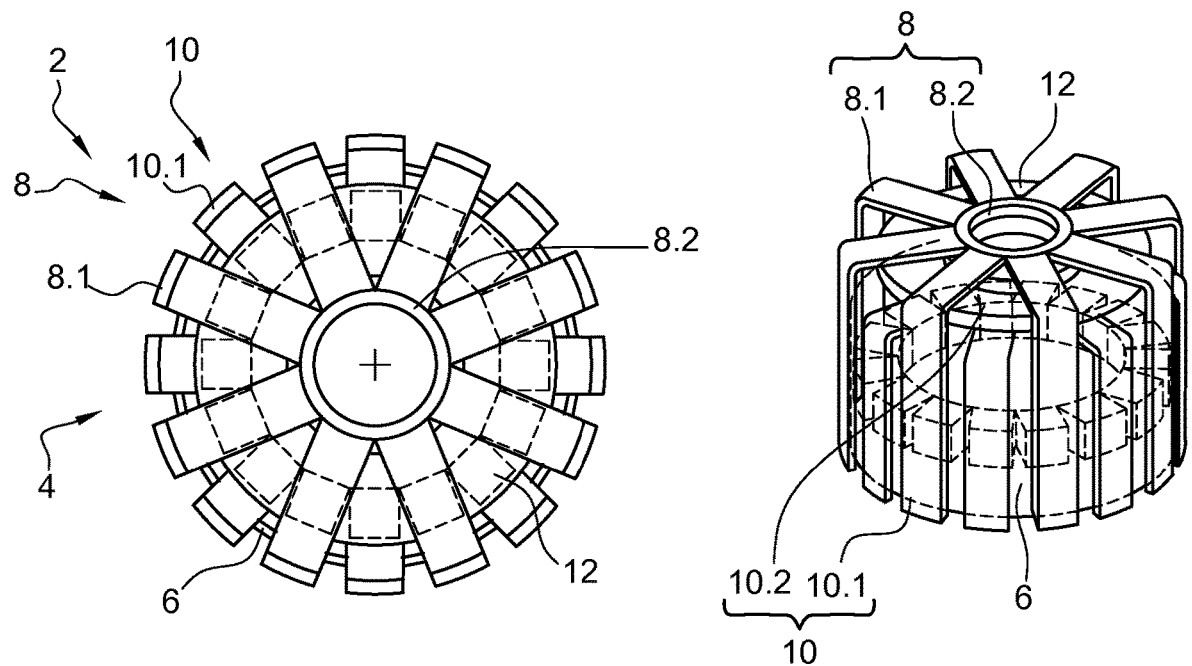
FIG. 1 is a top view and a perspective view of an electric generator according to the prior art.

FIG. 1 comprises a top view and a perspective view of an electric generator according to the state of the art. The electric generator 2 comprises essentially a stator 4 and a rotor 6. The stator 4 comprises a series of arms 8.1 and 10.1 made of magnetic material. They are arranged circumferentially and essentially parallel to each other. The stator 4 comprises also a coil 12 magnetically coupled to the arms 8.1 and 10.1. The rotor 6 comprises a series of permanent magnets arranged along its circumference so as to, upon rotation, produce a variable magnetic field in the arms of the stator 4.

For instance, the rotor 6 is located inside the stator 4 and is configured for producing the magnetic field predominantly at its outer periphery. For instance it can comprise a series of permanent magnets in a standard alternation of North-South pole pairs along the periphery, or in a Halbach arrangement of North-Rotation 90°-South-Rotation 90° poles.

For instance, the stator 4 comprises two yokes 8 and 10 which are superposed and interdigitated. Each yoke 8 and 10 comprises a series of arms 8.1 and 10.1 extending essentially axially from a central portion 8.2 and 10.2, respectively. The coil 12 is sandwiched between the central portions 8.2 and 10.2 of the yokes 8 and 10. The central portions 8.2 and 10.2 extend through the coil 12, the coil 12 comprising a winding around the portions.

In the example of FIG. 1, each yoke comprises 8 arms, resulting in 16 arms in total. Each arm is distant from each directly adjacent arms so as to form slots. The rotor 6 comprises 16 magnets forming 8 pole pairs.

Figure 2:
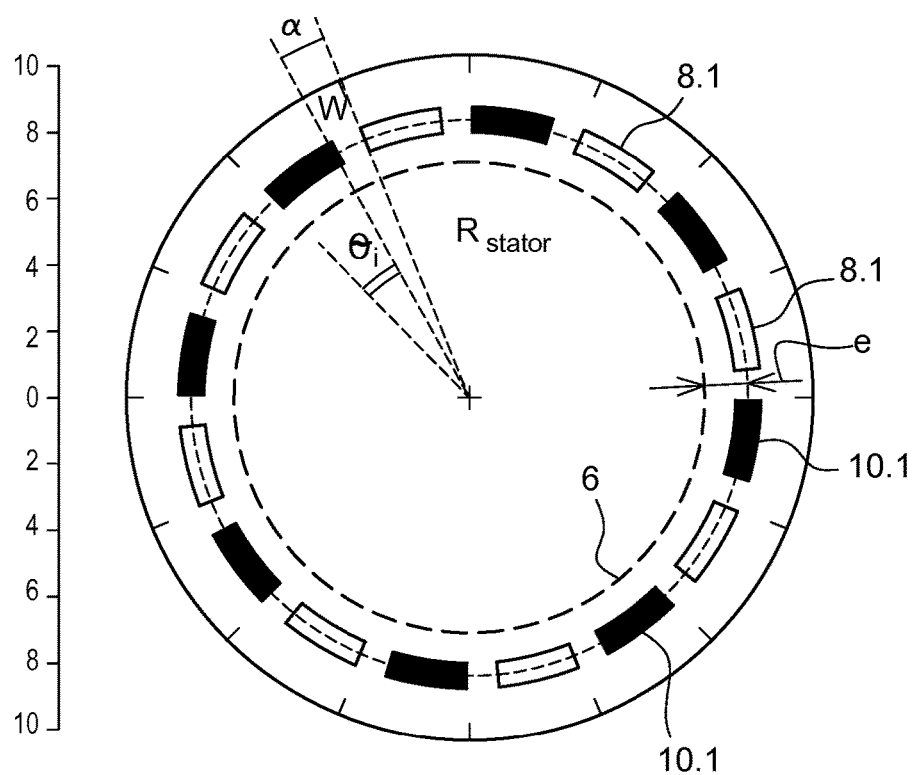
FIG. 2 illustrates in bottom view the slot distribution of the stator of the electric generator of FIG. 1.

FIG. 2 illustrates in a schematic manner in bottom view the arm and slot distribution of the stator of the electric generator of FIG. 1. We can observe the interdigitated arms 8.1 and 10.1 arranged circumferentially and in an alternating manner. Each arm 8.1 and 10.1 extends circumferentially over an angle $\theta_i$. They also show a circumferential air gap w. A radial air gap e is provided between the rotor 6 and the stator 4. As this is apparent, the distribution of the arms is regular, i.e. the angle $\theta_i$ is the same for each arm and the circumferentially air gap w is also constant.

For the purpose of studying and characterizing, in the following embodiments of the invention, a non-homogeneous distribution of the arms, we define the angular value $\theta_i$ of each arm as follows:

$$\theta_i = \frac{\langle \theta \rangle}{2} + i \cdot d\theta$$

where i is an integer incremental value from 1 to N, $\langle \theta \rangle$ is an average value of the angle of the arm and $d\theta$ is an incremental angle value, and $$\langle \theta \rangle = \frac{2\pi - N \cdot \alpha}{N}, \text{ with}$$

$$\alpha = \frac{w}{R_{stator}}$$

with $R_{stator}$ the radius of the stator 4.
For the total number of sectors N, $$\sum_{i=1}^{N} \theta_i = N \cdot \frac{\langle \theta \rangle}{2} + d\theta \cdot \frac{N \cdot (N+1)}{2} = 2\pi - N \cdot \alpha,$$

so that the incremental angle value is $$d\theta = \frac{\pi - \frac{N}{2} \cdot \alpha}{\frac{N \cdot (N+1)}{2}}.$$

For N=16 sectors and arms, the incremental angle value is $$d\theta = \frac{\pi}{136} - \frac{\alpha}{17},$$

and the angle of each arm is $$\theta_i = \frac{\pi}{16} - \frac{\alpha}{2} + i \cdot \left(\frac{\pi}{136} - \frac{\alpha}{17}\right).$$

For a homogeneous distribution as in FIG. 2, the above incremental calculation does not apply and the constant angular value of the arms is $$\theta_i^{regular} = \frac{2\pi - N \cdot \alpha}{N} = \frac{\pi}{8} - \alpha$$

For a stator radius $R_{stator}$=8.55 mm and a circumferential air gap w=1 mm, $\alpha$=0.117 radian=6.7°.

Still with reference to FIGS. 1 and 2, the stator 4 forms an alternating arrangement of air gap, i.e. air, and magnetic material, i.e. an arm. Similarly, the rotor 6 produces in this alternating arrangement of air gap and magnetic material of the stator 4 a magnetic field that shows an alternating arrangement of positive and negative values passing by zero. While rotating relative to the stator, the rotor produces then in the magnetic material of each arm a variable magnetic field, thanks to the magnetic permeability of the material. This variable magnetic field is transmitted along each arm 8.1 and 10.1 to the central portions 8.2 and 10.2 of the yokes 8 and 10, and magnetizes the coil 12. The latter is therefore traversed by an alternating magnetic field which induces an electromotive force producing an electrical voltage. Since the number of poles is equal to the number of arms and since the poles and arms are distributed homogeneously and regularly, the degree of correlation between the magnetic field produced by the rotor and the arms is the same in each arm, irrespective of the angular position between the rotor and the stator, being however clear that the correlation is maximum when the poles of the rotor are angularly aligned with the arms and minimum when intermediates position between each pair of poles (where the magnetic field is null) are angularly aligned with the arms. The degree of correlation has a direct influence on the specific power output the generator.

Figure 3:
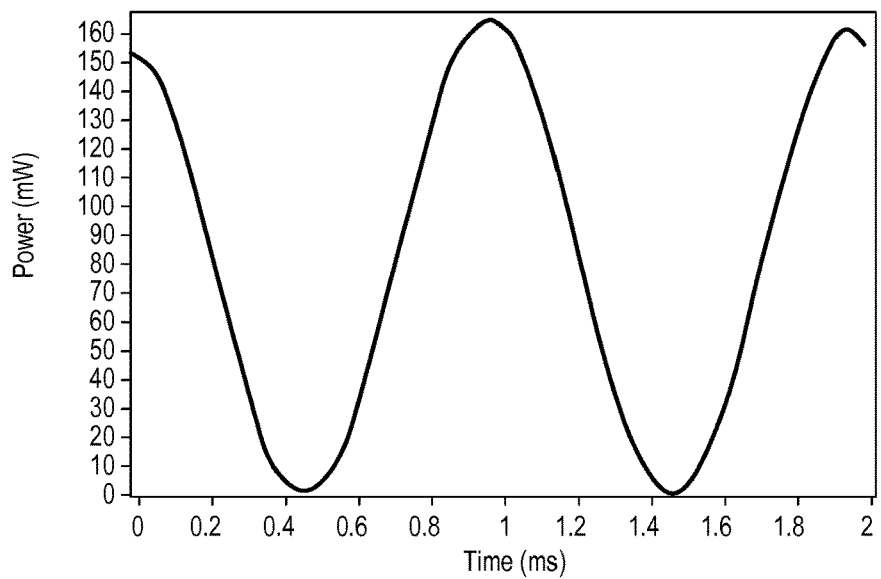
FIG. 3 is a graph of the output power over time of the electric generator of FIG. 1.
Figure 4:
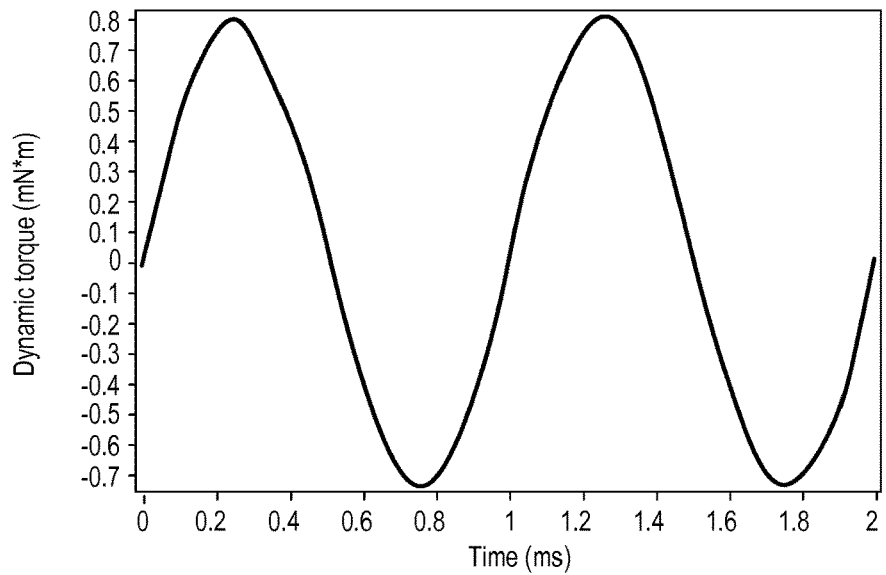
FIG. 4 is a graph of the dynamic torque output over time of the electric generator of FIG. 1.
Figure 5:
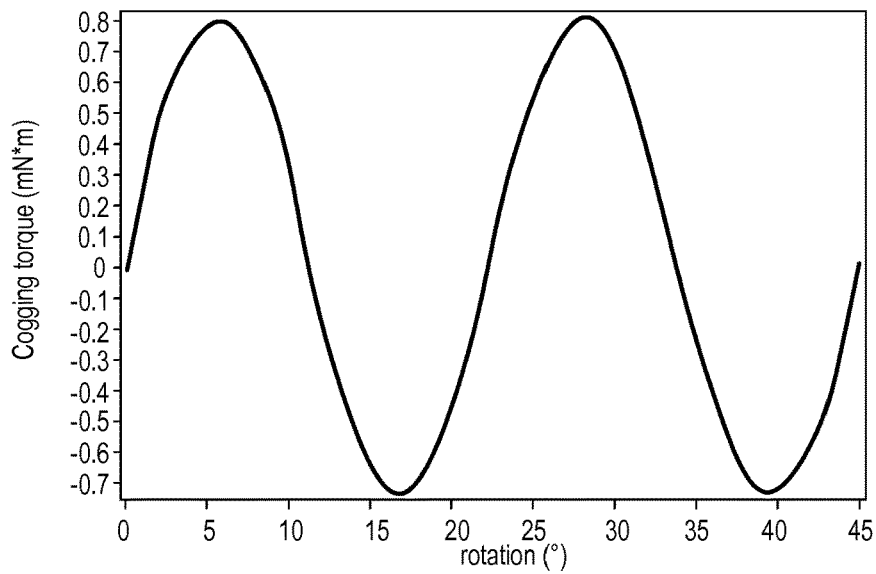
FIG. 5 is a graph of the cogging torque over time of the electric generator of FIG. 1.

FIGS. 3 to 5 are graphs illustrating calculated values of the output electrical power, the dynamic torque and the cogging torque of the generator of FIGS. 1 and 2. The dynamic torque represents the cumulate contributions of the cogging torque and the braking torque due to the eddy currents contribution. This braking torque increases with angular speed. As the angular speed increases, the magnetic flux generated by the eddy currents increases, which causes the net magnetic flux to decrease with speed. The calculation is based on a model using a Finite Element Analysis software (COMSOL). For instance, the rotation speed is of 3780 rpm. The stator material is composed of a soft magnetic material of NiFe alloy with a conductivity of $\sigma$=1.227*10$^{+6}$ S/m and a permeability of 1800. The copper coil sandwiched by the two parts of the stator presents an inductance of 26.5 mH for a DC resistance of 1.31 ohm. A resistive load of 20 ohms is connected on the coils to measure the electrical outputs (voltages, electrical power). The cogging torque is calculated in the static regime for the angular position of the rotor against the stator slots for a range of $$2 \cdot \left(\theta_i^{regular} + \alpha\right) = \frac{\pi}{4}$$

radians.

Figures 6, 7:
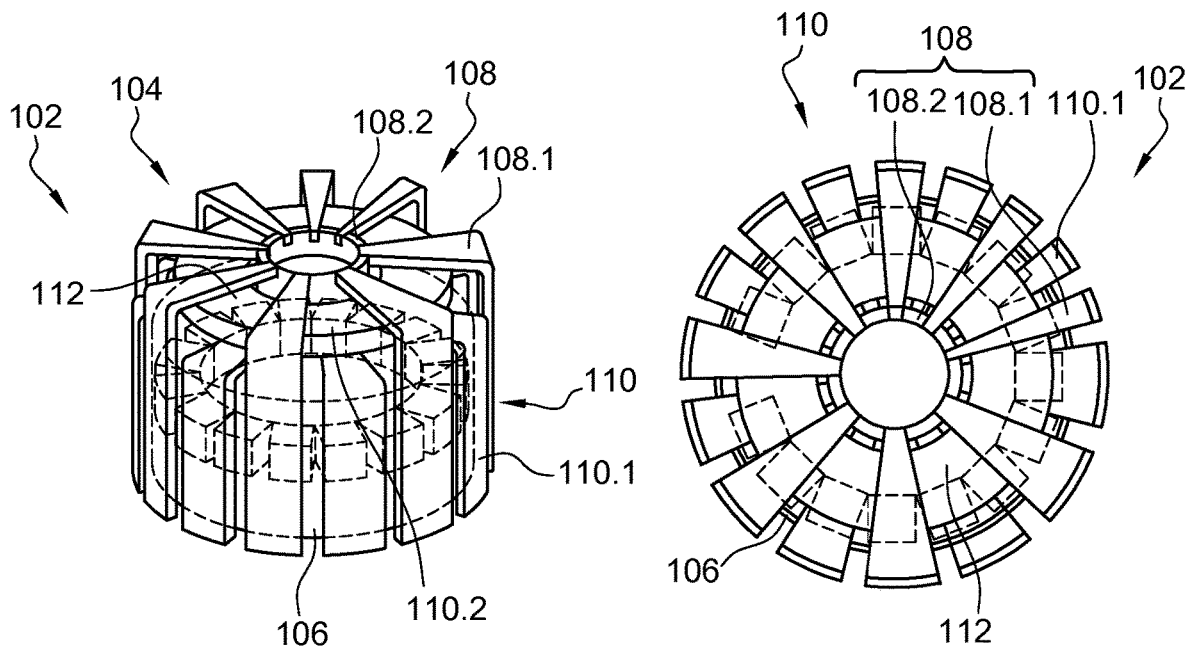
FIG. 6 is a comparative table of the magnetic flux amplitude through the coil 12, the output electrical power, the dynamic torque, the cogging torque, and the mechanical to electrical conversion efficiency for different values of the radial air gap e between the rotor and the stator.
FIG. 7 is a top view and a perspective view of an electric generator according to a first exemplary embodiment of the invention.

FIG. 6 is a table summarizing the obtained values for these magnetic and mechanical outputs (first column for Reference Model 1). One possibility investigated to lower the values of the peak-to-peak dynamic (and also cogging) torque is to increase the air gap distance "e" between the outer part of the magnetic rotor and the inner part of the stator. Although this will increase the total diameter of the stator and therefore the dimensions of the generator, we obtain for higher value of e (1.5 mm and 2.5 mm, as Reference Models 2 and 3) lower values of the peak-to-peak dynamic torque (respectively 0.404 and 0.039 mN·m, instead of 1.55 mN·m for Reference Model 1). However we can note a strong decreasing of the output electrical power of the generator (down to 11.4 mW for e=2.5 mm). The last line of the table gives an estimation of the efficiency of the generator by the ratio of the output electrical power over the input mechanical power.

The above discussed degree of correlation between the magnetic field produced by the rotor and the arms of the stator shows a maximum value of 0.7.

According to various embodiments of the invention, the distribution of the angular width of the arms and/or slots can be varied so as to be non-homogeneous, for modifying in an advantageous manner the dynamic torque and/or the cogging torque. In the remaining figures, from FIG. 6 onwards, three variable steps generators will be presented in details, forming embodiments of the invention.

FIGS. 7 to 12 illustrate a first embodiment of the invention, based on the above described generator where the angular width of the arms is linearly incremented. The reference numbers of FIGS. 1-6 are used here for designating the same or corresponding elements, these numbers being however incremented by 100. It is also referred to the description of these elements.

Figure 8:
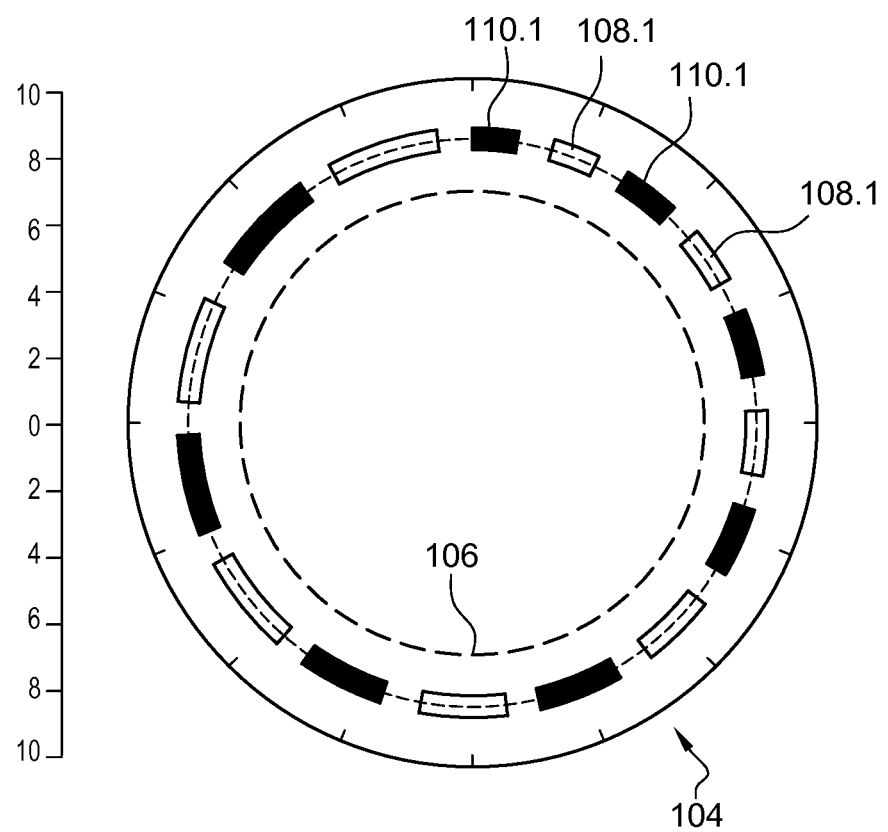
FIG. 8 illustrates the bottom view of the slot distribution of the stator of the electric generator of FIG. 7, in accordance with various embodiments of the invention.

In FIGS. 7 and 8, we can observe that the angular width of the arms 108.1 and 110.1 progressively increases, more particularly in FIG. 8 when starting from the arm 108.1 located at the top of the drawing and going clockwise. The rotor 106 remains unchanged compared with FIGS. 1 and 2.

Figure 9:
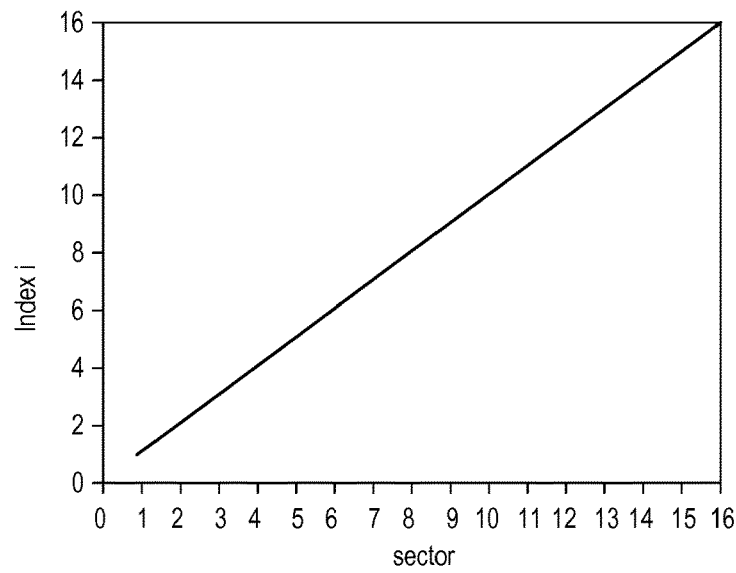
FIG. 9 illustrates the increment distribution of the stator of the electric generator of FIG. 7, in accordance with various embodiments of the invention.

FIG. 9 illustrates the increment for the 2$^{nd}$ to 16th arms in the following equation already presented in relation with FIG. 2:

$$\theta_i = \frac{\langle\theta\rangle}{2} + i \cdot d\theta.$$

The degree of correlation between the magnetic field produced by the rotor and the arms shows a maximum value of 0.35.

Figure 10:
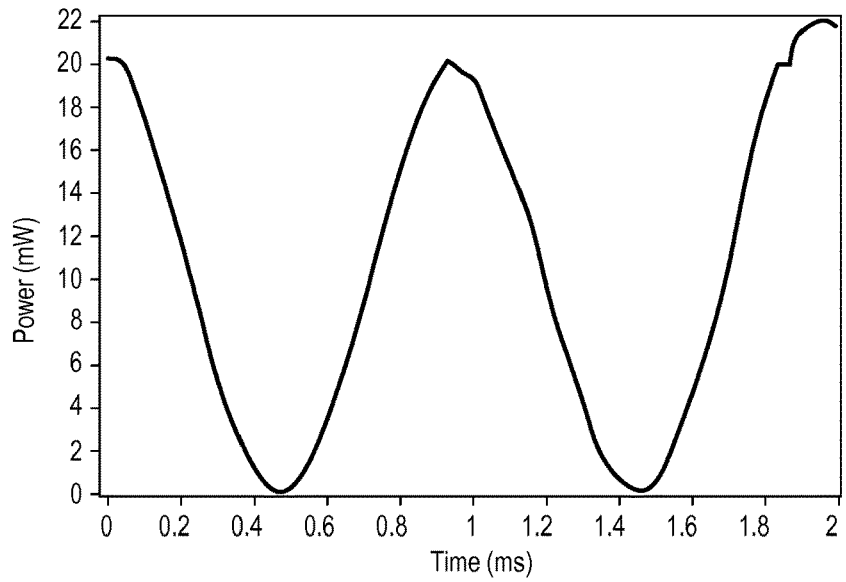
FIG. 10 is a graph of the output power over time of the electric generator of FIG. 7, in accordance with various embodiments of the invention.
Figure 11:
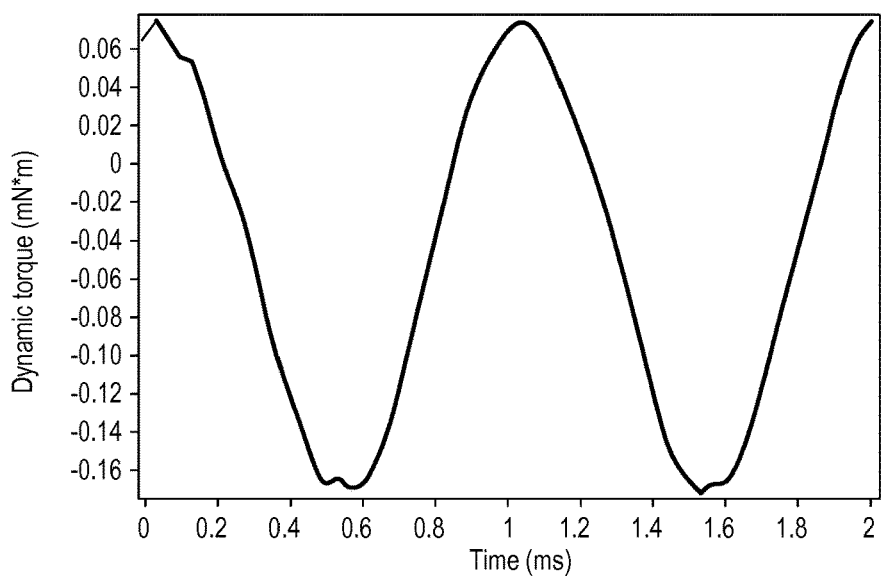
FIG. 11 is a graph of the dynamic torque over time of the electric generator of FIG. 7, in accordance with various embodiments of the invention.
Figure 12:
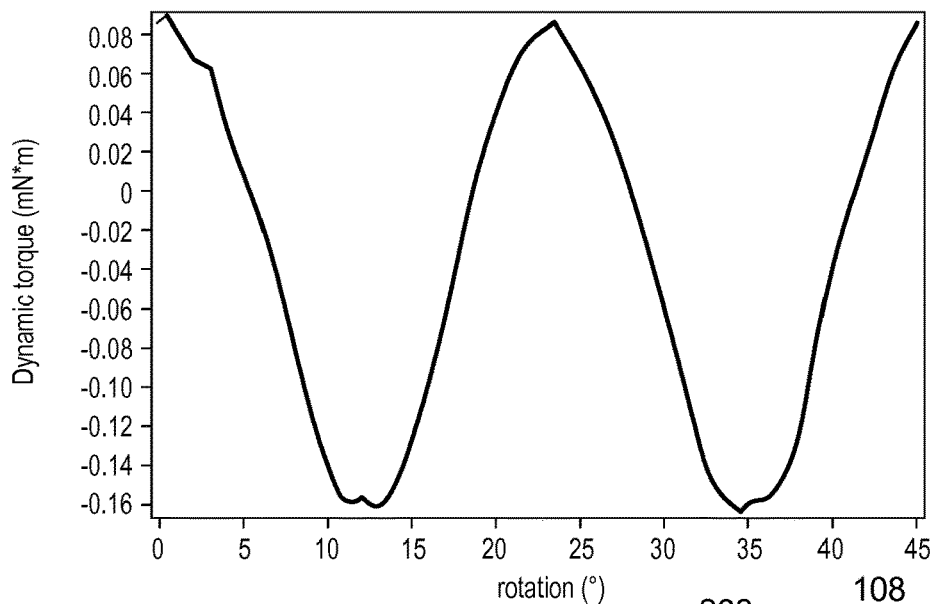
FIG. 12 is a graph of the cogging torque over time of the electric generator of FIG. 7, in accordance with various embodiments of the invention.

FIGS. 10 to 12 are graphs illustrating calculated values of the output electrical power, the dynamic torque and the cogging torque of the generator of FIGS. 7 to 9. They show a substantial decrease of the cogging torque. They show also a decrease of the dynamic torque compared to reference models 1 and 2 of FIGS. 1-6 (see FIG. 6), but also a decreasing of the efficiency Γ=5.72%, i.e. the ratio of electrical output power over input mechanical power. Compared to the Reference model 3, the linear increment model provides more output electrical power by a factor two, but here also with a lower efficiency Γ.

FIGS. 13 to 17 illustrate a second embodiment of the invention, based on the above generator of FIGS. 1 to 6 where the angular width of the arms is randomly incremented. The reference numbers of FIGS. 1-6 are used here for designating the same or corresponding elements, these numbers being however incremented by 200. It is also referred to the description of these elements.

As this is apparent in FIG. 14, the increment i for the N=16 sectors, in the following equation already presented in relation with FIG. 2:

$$\theta_i = \frac{\langle\theta\rangle}{2} + i \cdot d\theta$$

is randomly distributed (random distribution R02).

The degree of correlation between the magnetic field produced by the rotor and the arms shows a maximum value of 0.43.

Figure 13:
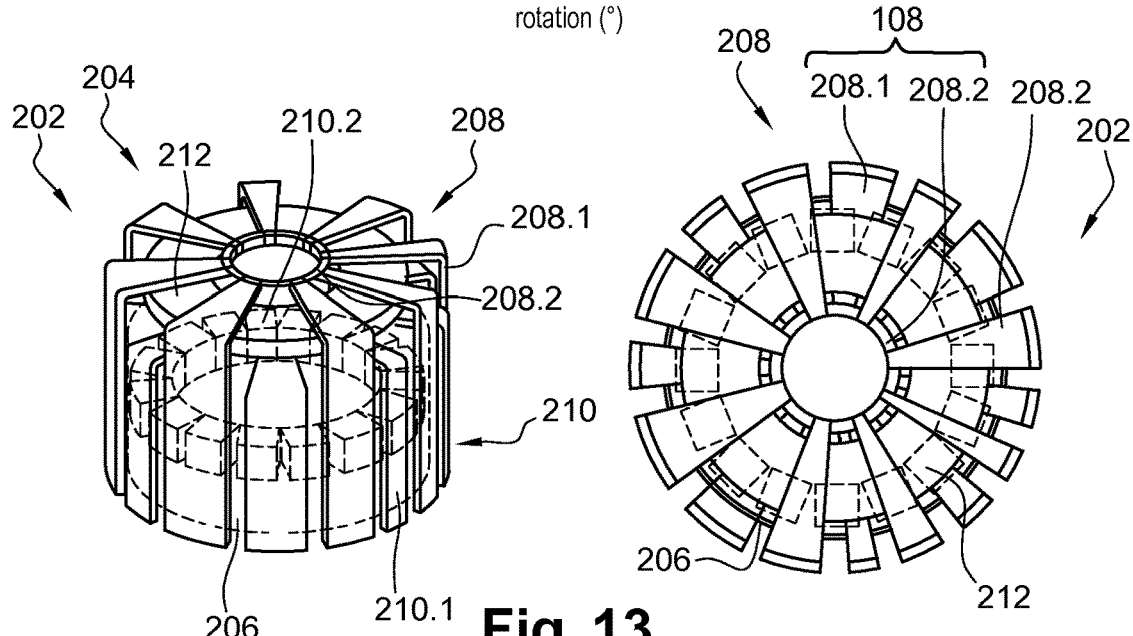
FIG. 13 is a perspective view and a top view of an electric generator according to a second exemplary embodiment of the invention.
Figure 14:
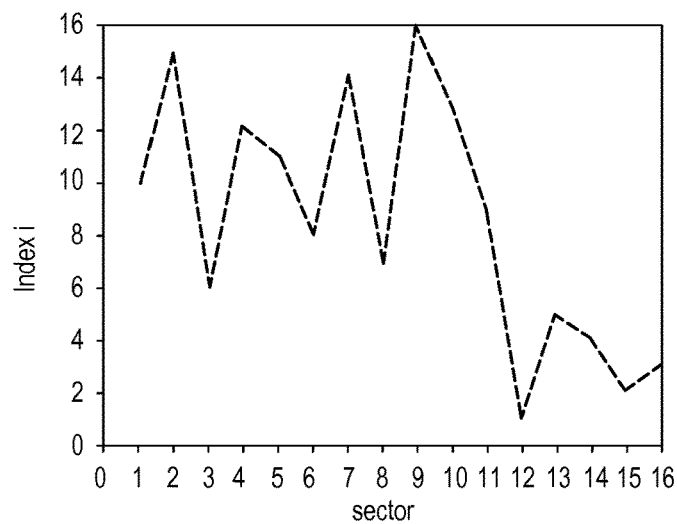
FIG. 14 illustrates the increment distribution of the stator of the electric generator of FIG. 13, in accordance with various embodiments of the invention.
Figure 15:
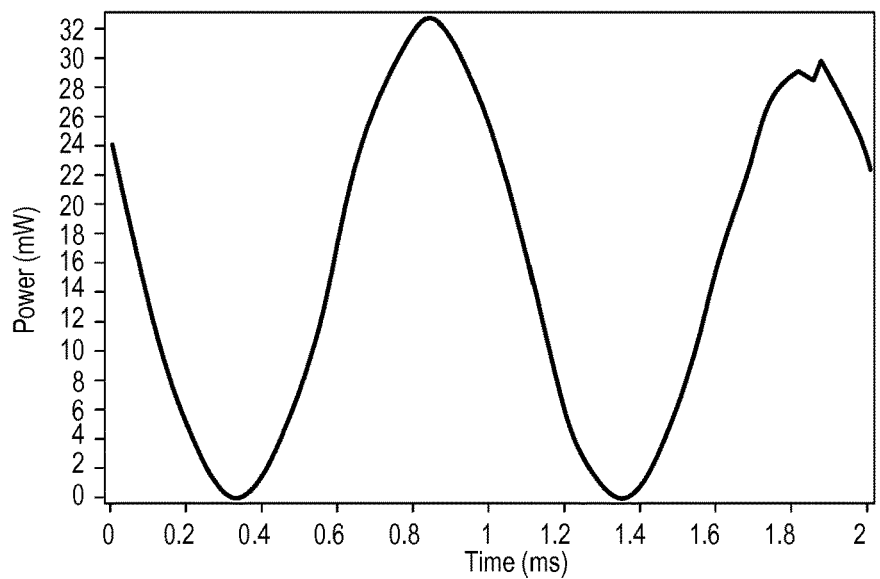
FIG. 15 is a graph of the output power over time of the electric generator of FIG. 13, in accordance with various embodiments of the invention.
Figure 16:
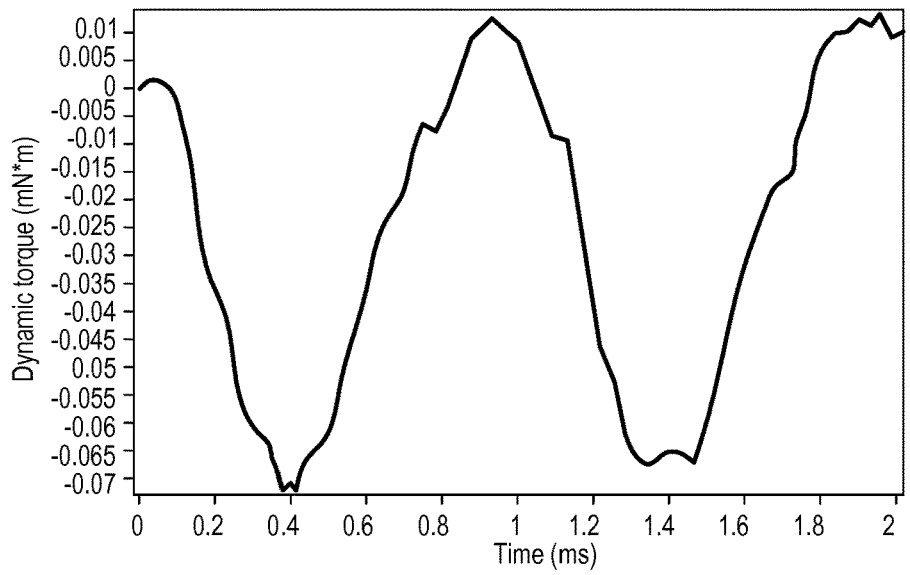
FIG. 16 is a graph of the dynamic torque over time of the electric generator of FIG. 13, in accordance with various embodiments of the invention.
Figure 17:
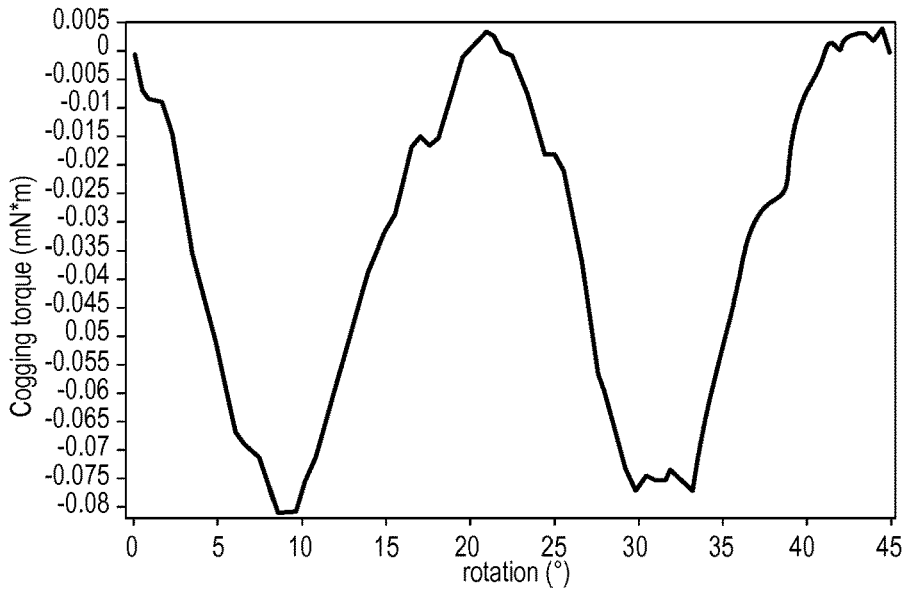
FIG. 17 is a graph of the cogging torque over time of the electric generator of FIG. 13, in accordance with various embodiments of the invention.

FIGS. 15 to 17 are graphs illustrating calculated values of the output electrical power, the dynamic torque and the cogging torque of the generator of FIGS. 13 and 14. We can observe that the cogging torque is further reduced compared with the first embodiment of FIGS. 7 to 12 (see in particular FIG. 12). The peak-to-peak dynamic torque is lowered to 0.085 mN·m for an output electrical power of 33 mW. These results shows a better and excellent efficiency of Γ=24.52% compared to the linear increment model with Γ=5.72%.

FIGS. 18 to 22 illustrate a third embodiment of the invention, based on the above generator of FIGS. 1 to 6 where the angular width of the arms is randomly incremented. The reference numbers of FIGS. 1-6 are used here for designating the same or corresponding elements, these numbers being however incremented by 300. It is also referred to the description of these elements.

This third embodiment is another random distribution (random distribution R05) of the increment i for the N=16 sectors, in the following equation already presented in relation with FIG. 2:

$$\theta_i = \frac{\langle\theta\rangle}{2} + i \cdot d\theta$$

similarly to the second embodiment.

The degree of correlation between the magnetic field produced by the rotor and the arms shows a maximum value of 0.39.

Figure 18:
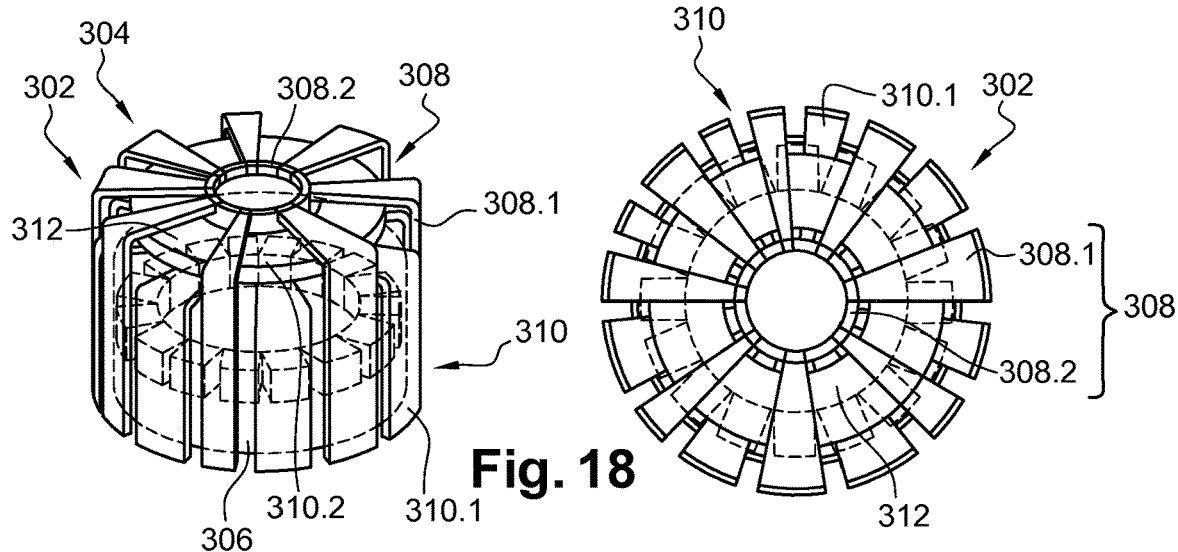
FIG. 18 is a perspective view and a top view of an electric generator according to a third exemplary embodiment of the invention.
Figure 19:
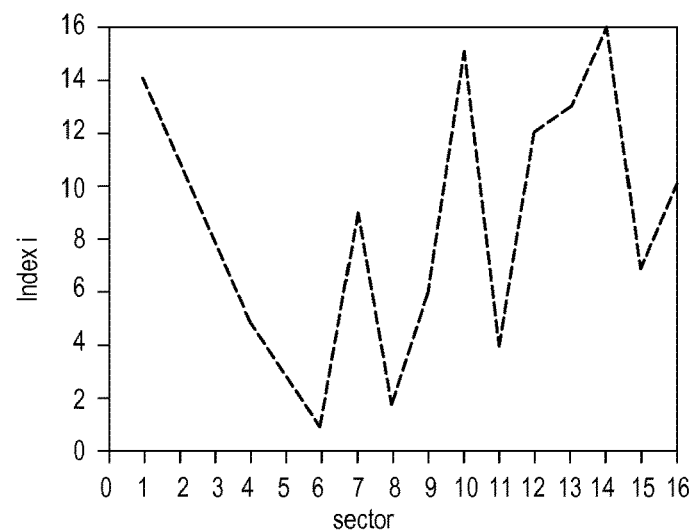
FIG. 19 illustrates the increment distribution of the stator of the electric generator of FIG. 18, in accordance with various embodiments of the invention.
Figure 20:
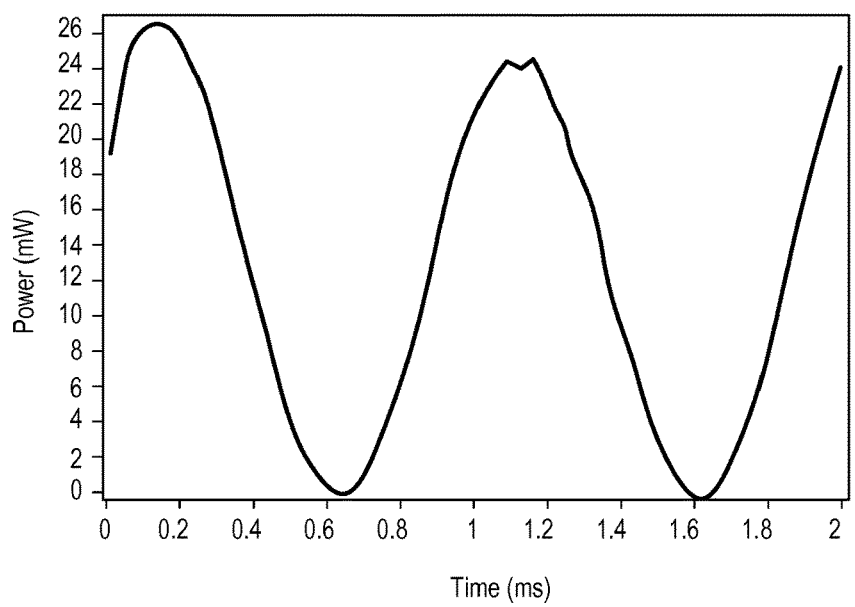
FIG. 20 is a graph of the output power over time of the electric generator of FIG. 18, in accordance with various embodiments of the invention.
Figure 21:
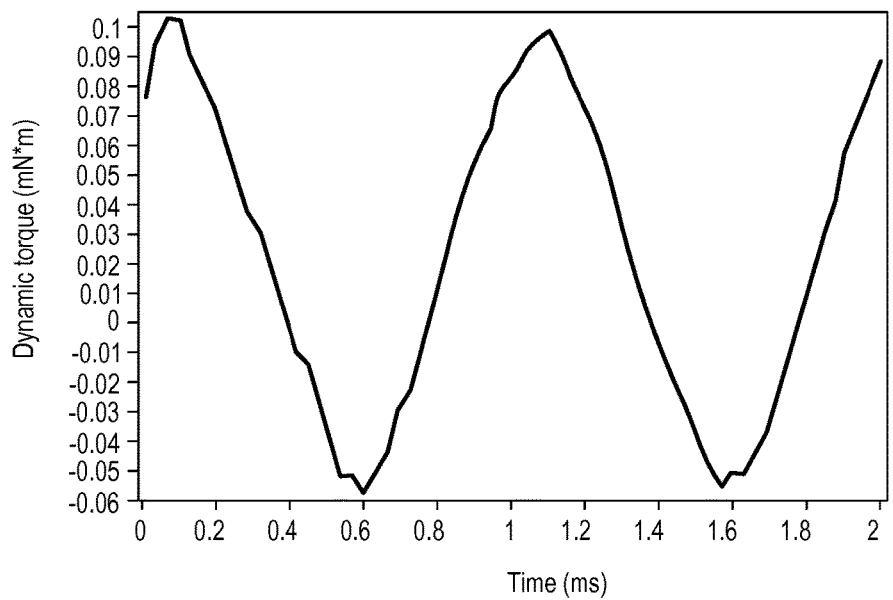
FIG. 21 is a graph of the dynamic torque over time of the electric generator of FIG. 18, in accordance with various embodiments of the invention.
Figure 22:
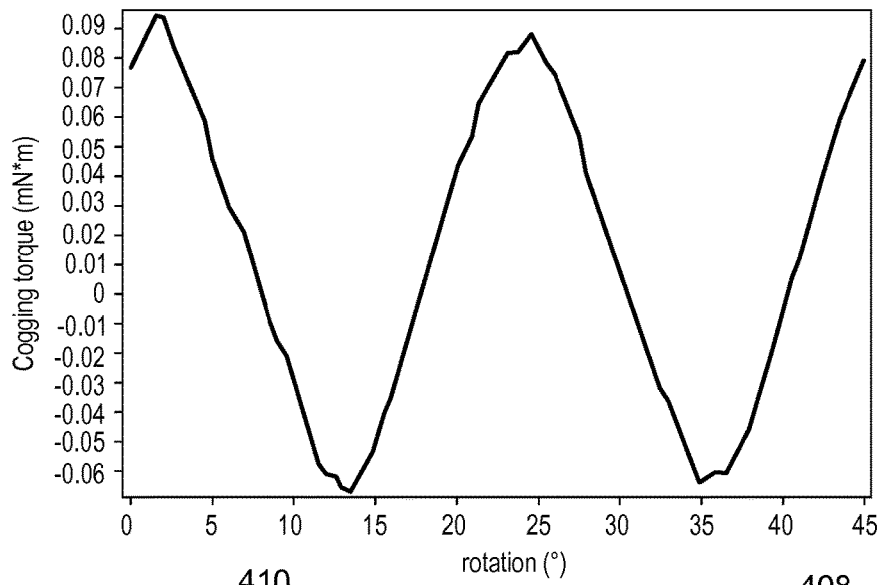
FIG. 22 is a graph of the cogging torque over time of the electric generator of FIG. 18, in accordance with various embodiments of the invention.

FIGS. 20 to 22 are graphs illustrating calculated values of the output electrical power, the dynamic torque and the cogging torque of the generator of FIGS. 18 and 19.

FIGS. 23 to 27 illustrate a fourth embodiment of the invention, based on the above generator of FIGS. 1 to 6 where the angular width of the arms is randomly incremented. The reference numbers of FIGS. 1-6 are used here for designating the same or corresponding elements, these numbers being however incremented by 400. It is also referred to the description of these elements.

This fourth embodiment is a further random distribution (random distribution R06) of the increment i for the N=16 sectors with regard to the second and third embodiments.

The degree of correlation between the magnetic field produced by the rotor and the arms shows a maximum value of 0.37.

Figure 23:
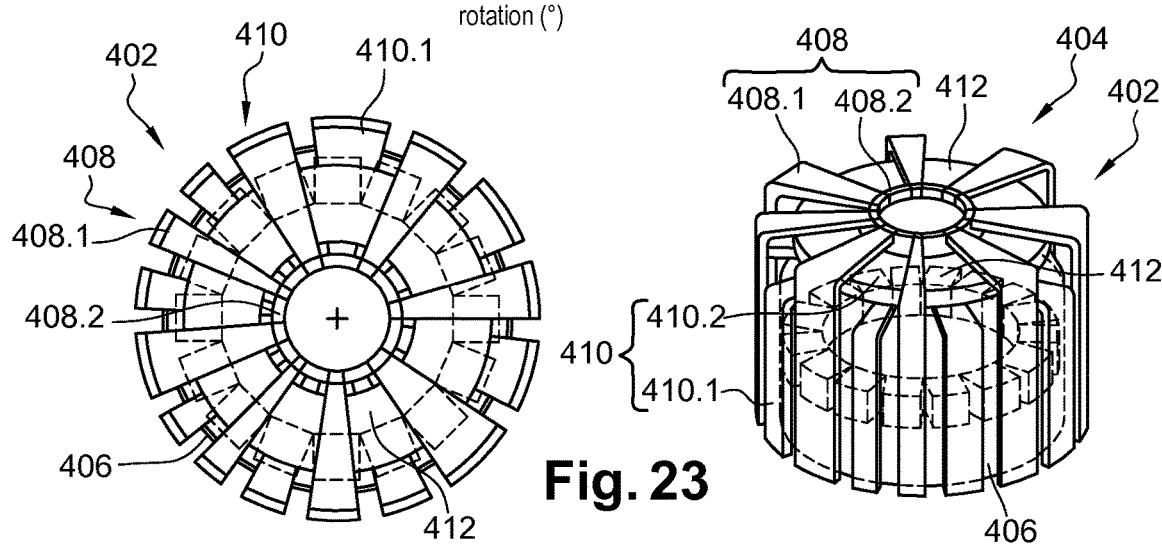
FIG. 23 is a top view and a perspective view of an electric generator according to a fourth exemplary embodiment of the invention.
Figure 24:
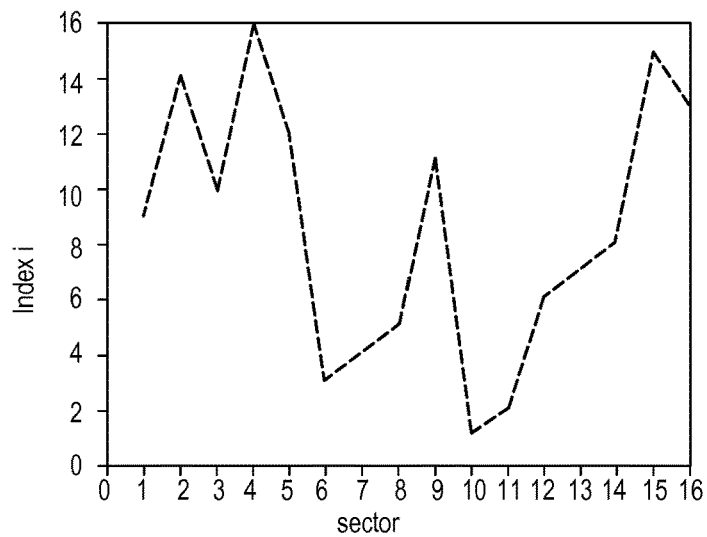
FIG. 24 illustrates the increment distribution of the stator of the electric generator of FIG. 23, in accordance with various embodiments of the invention.
Figure 25:
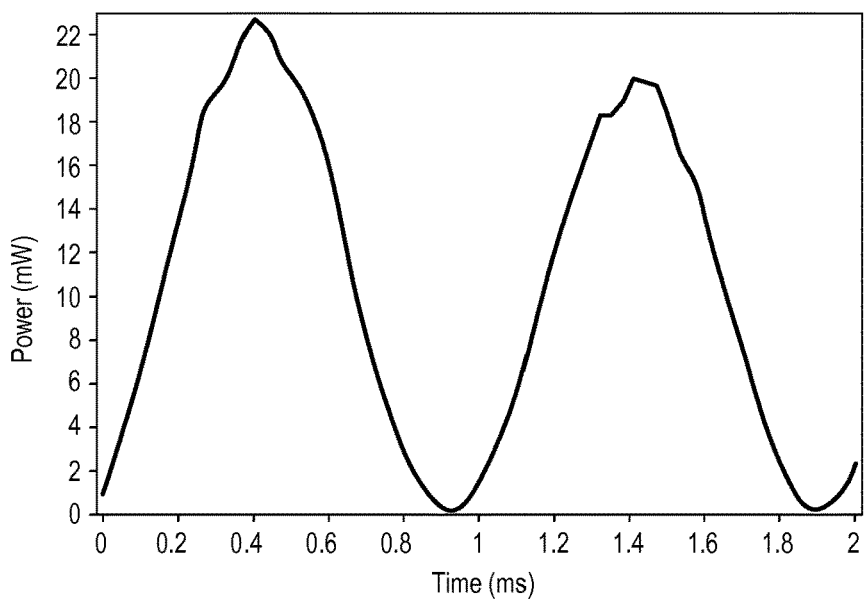
FIG. 25 is a graph of the output power over time of the electric generator of FIG. 23, in accordance with various embodiments of the invention.
Figure 26:
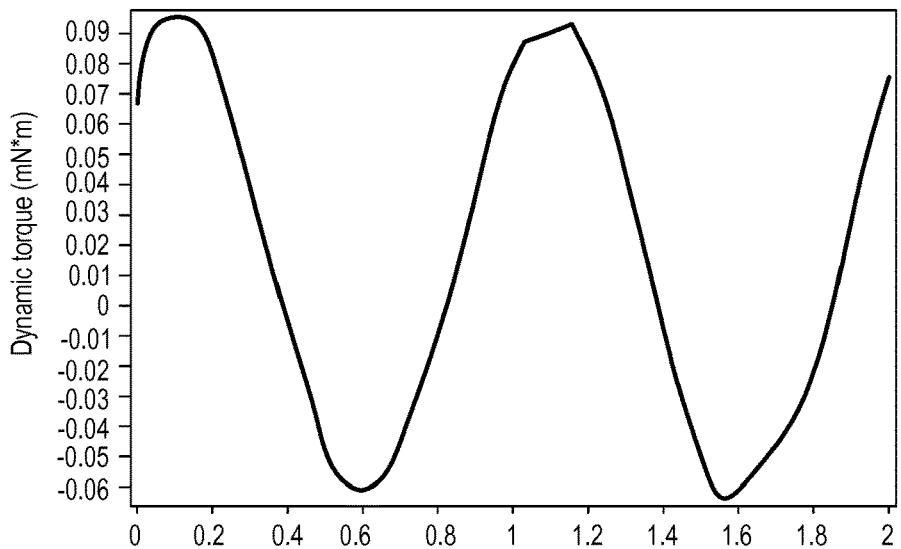
FIG. 26 is a graph of the dynamic torque over time of the electric generator of FIG. 23, in accordance with various embodiments of the invention.
Figure 27:
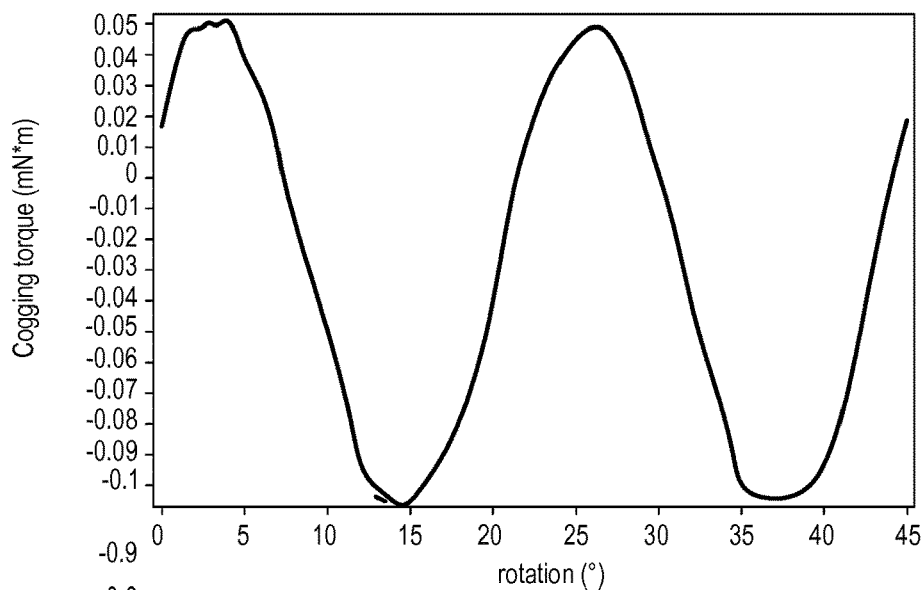
FIG. 27 is a graph of the cogging torque over time of the electric generator of FIG. 23, in accordance with various embodiments of the invention.

FIGS. 25 to 27 are graphs illustrating calculated values of the output electrical power, the dynamic torque and the cogging torque of the generator of FIGS. 23 and 24.

Figure 28:
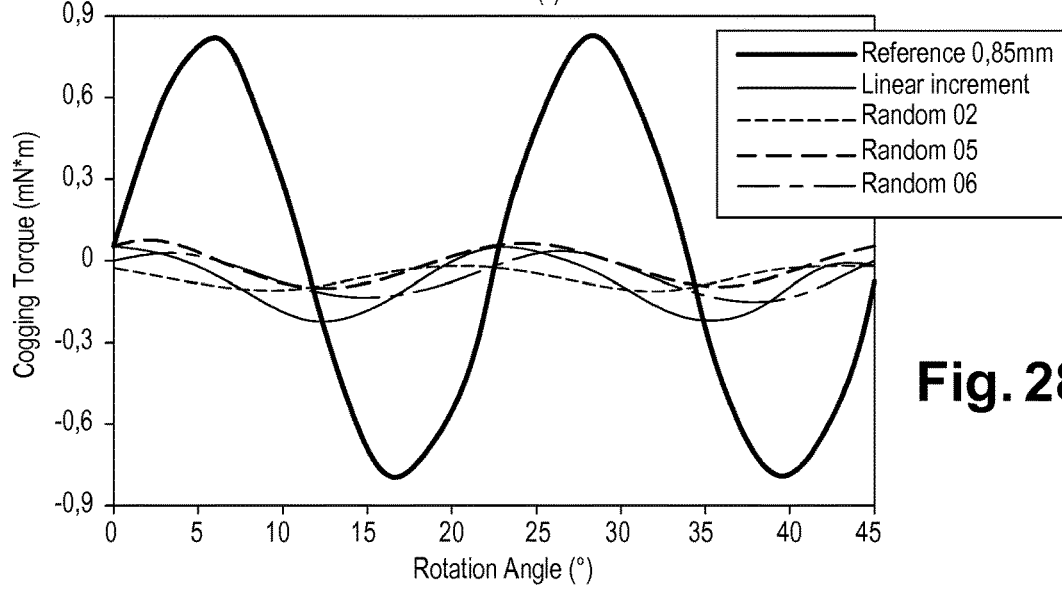
FIG. 28 is a graph of the cogging torques over time of the different electric generators of FIGS. 1, 7, 13, 18 and 23, in accordance with various embodiments of the invention.
Figure 29:
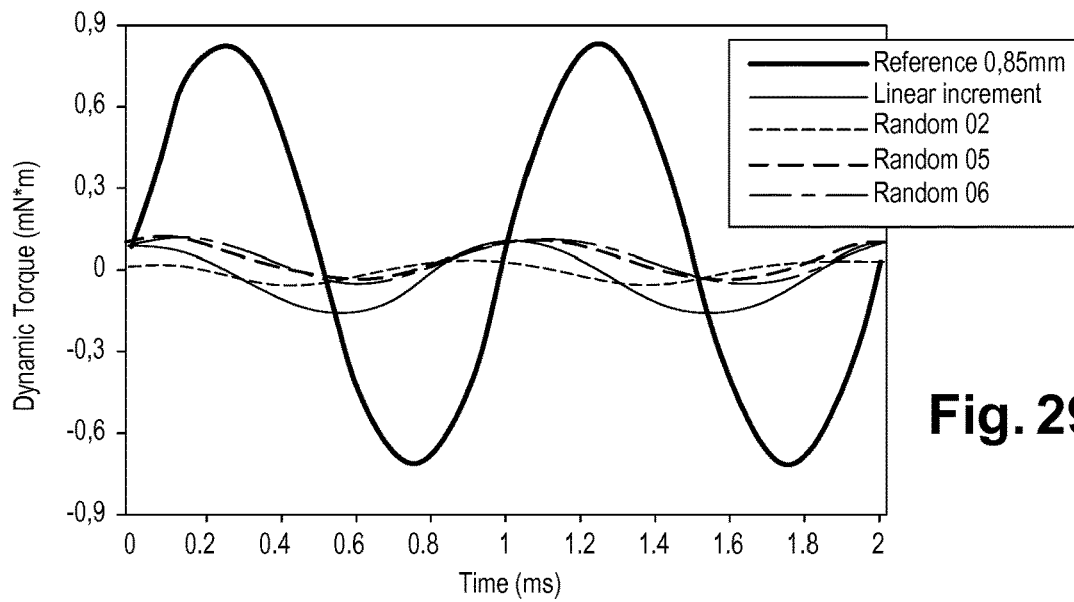
FIG. 29 is a graph of the cogging torques over time of the different electric generators of FIGS. 1, 7, 13, 18 and 23, in accordance with various embodiments of the invention.
Figures 30, 31:
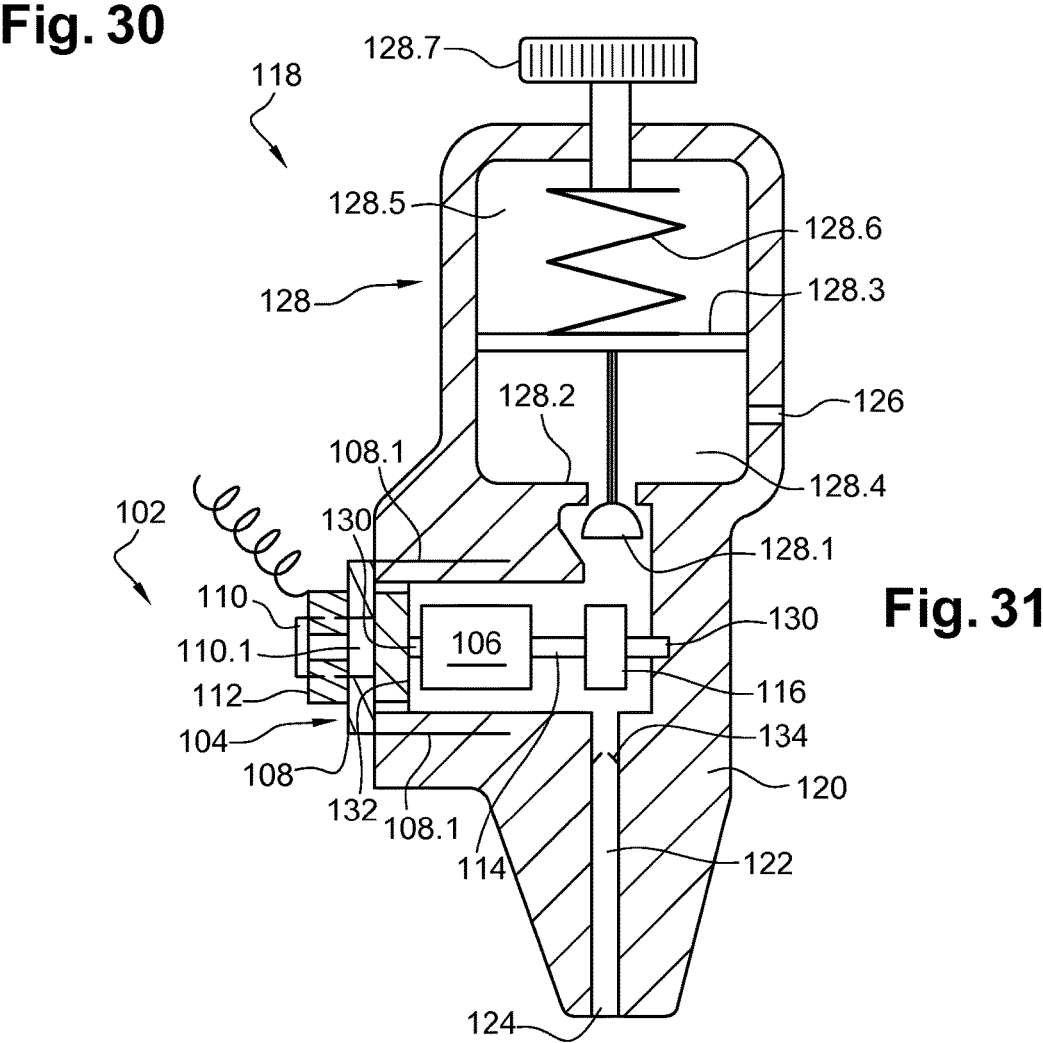
FIG. 30 is a comparative table of the magnetic flux amplitude through the coil, the output electrical power, the stator/rotor correlation factor, the dynamic torque, cogging torque, and the mechanical to electrical conversion efficiency for the different electric generators of FIGS. 1, 7, 13, 18 and 23, in accordance with various embodiments of the invention.
FIG. 31 is a schematic sectional view of a valve into which an electric generator according to various exemplary embodiments of the invention is integrated.

FIGS. 28 to 30 summarize the above described electric generators by providing comparative graphs of their cogging torques and of their dynamic torques, and a comparative table of the output power, the correlation factor, the cogging torque, the dynamic torque and the efficiency.

In FIG. 28, we observe that the linear increment and each of the three examples of random generated sequences (R02, R05 and R06) achieves a substantially lower peak-to-peak cogging torque modulation compared with the reference model (i.e. with a constant arm width). Similarly, in FIG. 29, we observe that the linear increment and each of the three examples of random generated sequences (R02, R05 and R06) achieves a substantially lower peak-to-peak dynamic torque modulation. In FIG. 30 we observe that the efficiencies of the electric generators remain of the same order for linear increment compared with the reference model, whereas it shows a clear increase for each of the although the output electrical power level is higher, meaning that the three examples of random generated sequences (R02, R05 and R06), more particularly for the R02.

More generally, the above four embodiments of the invention show that in an electrical generator with an armed stator providing a non-uniform distribution of the arms decreases the cogging torque. Providing a random distribution of the arm width not only decreases the cogging torque but also increases the efficiency.

FIG. 31 is a schematic sectional representation of an electric generator according to various embodiments of the invention coupled to a turbine wheel and integrated into or mounted on a valve or conduit. In that figure, the reference numbers of the first embodiment (FIGS. 7-12) are used. Specific reference numbers between 100 and 200 are used for designating specific elements. It is however understood that this integration into a valve or conduit applies also to the other embodiments of the electric generator. The rotor 106 of the electric generator 102 comprises a shaft 114 which is coupled to a turbine wheel 116.

The valve 118 comprises a body 120 with a gas passage 122 interconnecting a gas inlet 124 with a gas outlet 126 on the body. The valve comprises a pressure reducer 128 that comprises a shutter 128.1 cooperating with a seat 128.2 where both are arranged in the gas passage 122 for shutting-off the passage. The pressure reducer 128 comprises also a piston 128.3 mechanically linked to the shutter 128.1 and slidable in a bore formed in the body 120. The piston 128.3 delimits with the bore in the body 120 a regulating chamber 128.4 that is downstream of the shutter 128.1 and its seat 128.2, and in a chamber 128.5 housing a spring 128.6 that elastically biases the piston 128.3 in a direction that acts on the shutter 128.1 so as to open the gas passage 122 in the seat 128.2. A device 128.7 for adjusting the pre-constraint of the spring 128.6 can be provided. The construction of the regulating valve described here above is as such well known to the skilled person.

The electric generator 102 and the turbine wheel 116 are located in the high pressure part of the gas passage 122, i.e. upstream of the shutter 128.1 and the seat 128.2. As this is apparent, a cavity, such as a bore, has been formed in the body for receiving the rotor assembly of the generator, i.e. essentially the shaft 114 carrying the turbine wheel 116 and the rotor 106. A first bearing 130 is formed in the body for supporting the inner end of the shaft 114. The cavity in the body 120 is closed in a gas tight fashion by the plug 132 that forms a second bearing for the outer end of the shaft 114. The yokes 108 and 110 of the stator 104 are inserted into holes or longitudinal cavities formed in the body 120 at the periphery of the cavity housing the rotor 106. The coil 112 of the stator 104 is then outside of the gas passage 122 of the valve and can be easily connected to any kind of electric or electronic device associated with the valve 118.

Still with reference to FIG. 31, the turbine wheel 116 is located in the gas passage 124 such as to be driven by the flow of gas in the passage when the regulator 128 is open. More specifically, flow guiding means 134 can be provided in the passage directly upstream of the turbine wheel 116 in order to accelerate the fluid properly with regard to the design of the turbine wheel 116 so as to maximize the transfer of energy to the wheel.

Alternatively, the turbine wheel 116 can also be arranged on the low pressure side of the valve 118, i.e. downstream of the shutter 128.1 and the seat 128.2 of the pressure regulator 128.

The invention claimed is:

1. An electric generator, said generator comprising:
   a rotor with permanent magnets, configured for rotating about a rotation axis;
   a stator comprising at least one magnetic yoke with arms extending one of axially inside and axially outside of the rotor so as to be adjacent to one of a radial inner side and a radial outer side, respectively, of the rotor;
   wherein the arms of the at least one magnetic yoke are circumferentially distributed so as to form a slot between each pair of adjacent arms, each slot and each arm showing a width;
   wherein the widths of the arms have different values distributed along the circumference; and
   wherein each arm extends angularly over a sector $$\theta_i = \frac{\langle\theta\rangle}{2} + i \cdot d\theta$$

where i is an integer comprised between 1 and N; N being the number of arms and $\langle\theta\rangle$ being an average sector angle of the N arms.

2. The electric generator according to claim 1, wherein the width of the slots is constant along the circumference.

3. The electric generator according to claim 1, wherein the width of the arms increases progressively along the circumference.

4. The electric generator according to claim 3, wherein the width of the arms increases linearly along the circumference.

5. The electric generator according to claim 1, wherein the widths of the arms are distributed randomly along the circumference.

6. The electric generator according to claim 1, wherein for each next arm along the circumference i is incremented by 1.

7. The electric generator according to claim 1, wherein for each next arm along the circumference i is taken from a random permutation of the integers from 1 to N.

8. The electric generator according to claim 7, wherein the random permutation of the integers from 1 to N where N=16 is one of the following: [10, 15, 6, 12, 11, 8, 14, 7, 16, 13, 9, 1, 5, 4, 2, 3], [14, 11, 8, 5, 3, 1, 9, 2, 6, 15, 4, 12, 13, 16, 7, 10] and [9, 14, 10, 16, 12, 3, 4, 5, 11, 1, 2, 6, 7, 8, 15, 13].

9. The electric generator according to claim 1, wherein the at least one yoke comprises several yokes, the arms of the yokes repeatedly alternating along the circumference.

10. The electric generator according to claim 9, wherein each of the several yokes comprises a central portion interconnecting the arms of the yoke.

11. The electric generator according to claim 10, wherein each of the arms comprises a bent end portion fixed to the central portion.

12. The electric generator according to claim 10 further comprising an electric coil arranged between the central portions of the yokes.

13. The electric generator according to claim 1 further comprising a turbine wheel mechanically coupled to the rotor.

14. The electric generator according to claim 13 further comprising a shaft supporting the rotor and the turbine wheel, and bearings at each end of the shaft.

15. A valve for gas cylinder, said valve comprising:
   a body with an inlet, an outlet and a passage interconnecting the inlet and outlet;
   a flow control device mounted on the body and controlling the flow of gas in the passage;
   an electric generator with a turbine wheel located in the passage, configured for outputting electric power when the gas flow in the passage rotates the turbine wheel, wherein the electric generator comprises:
      a rotor with permanent magnets, configured for rotating about a rotation axis;
      a stator comprising at least one magnetic yoke with arms extending one of axially inside and axially outside of the rotor so as to be adjacent to one of a radial inner side and a radial outer side, respectively, of the rotor;
      wherein the arms of the at least one magnetic yoke are circumferentially distributed so as to form a slot between each pair of adjacent arms, each slot and each arm showing a width;
      wherein the widths of the arms have different values distributed along the circumference; and
      wherein each arm extends angularly over a sector $$\theta_i = \frac{\langle\theta\rangle}{2} + i \cdot d\theta$$

where i is an integer comprised between 1 and N; N being the number of arms and $\langle\theta\rangle$ being an average sector angle of the N arms.

16. A conduit with a wall delimiting a passage for a fluid and with an electric generator with a turbine wheel located in the passage so as to be driven when the fluid flows, wherein the generator comprises:
   a rotor with permanent magnets, configured for rotating about a rotation axis;

a stator comprising at least one magnetic yoke with arms extending one of axially inside and axially outside of the rotor so as to be adjacent to one of a radial inner side and a radial outer side, respectively, of the rotor;

wherein the arms of the at least one magnetic yoke are circumferentially distributed so as to form a slot between each pair of adjacent arms, each slot and each arm showing a width;

wherein the widths of the arms have different values distributed along the circumference; and wherein each arm extends angularly over a sector $$\theta_i = \frac{\langle \theta \rangle}{2} + i.d\theta$$

where i is an integer comprised between 1 and N; N being the number of arms and) (θ) being an average sector angle of the N arms.

17. A method for dimensioning an electric generator, said method comprising:
   a rotor with permanent magnets configured for rotating about a rotation axis;
   a stator comprising at least one magnetic yoke with arms extending one of axially inside and axially outside of the rotor so as to be adjacent to one of a radial inner side and a radial outer side, respectively, of the rotor; and
   wherein the arms are circumferentially distributed so as to form a slot between each pair of adjacent arms, each slot and each arm showing a width; and
   comprising the step of:
   dimensioning the widths of the arms with different values distributed along the circumference so as to lower a cogging torque on the rotor, wherein each arm extends angularly over a sector $$\theta_i = \frac{\langle \theta \rangle}{2} + i.d\theta$$

where i is an integer comprised between 1 and N; N being the number of arms and (θ) being an average sector angle of the N arms.

18. The method according to claim 17, wherein lowering a cogging torque on the rotor is relative to a configuration where the widths of the arms and the widths of the slots are constant along the circumference.

* * * * *